Oct. 24, 1933.    W. H. WALLACE ET AL    1,931,971

SELF LOCKING WEDGE

Filed April 13, 1932

INVENTORS.
William H. Wallace,
Thurman C. Morrison,
Clarence A. Bieber.
BY
ATTORNEYS.

Patented Oct. 24, 1933

1,931,971

UNITED STATES PATENT OFFICE 1,931,971

SELF-LOCKING WEDGE

William H. Wallace, Detroit, Thurman C. Morrison, Grosse Pointe, Mich., and Clarence A. Bieber, Cleveland Heights, Ohio, assignors to Eaton Manufacturing Company, Cleveland, Ohio, a corporation of Ohio Application April 13, 1932. Serial No. 605,020

5 Claims. (Cl. 267—52)

Our invention relates to wedges and particularly to a wedge of the self-locking type and of bifurcated form capable of being inserted over an element.

While there are many uses for a self-locking wedge of this type, the wedges herein described and illustrated are employed primarily in the automotive art to be utilized in connection with the front axle and springs to provide the proper tilt or "caster" thereto. It is well known by those skilled in the automotive art that the front axle should be so disposed relative to the body as to retain the king pins, on the ends thereof, slanted frontwardly of a centerline through the axis so as to retain the wheels in "straight ahead" position, which is further beneficial in preventing the shimmying of the wheels which oftentimes occurs. When the axle is tilted from the original position through the wearing of the shackles, the setting of the spring or the like, it becomes necessary to readjust the axle relative thereto so as to provide the proper "caster". For this reason the present wedge has been invented which is of the self-locking type to permit it to be readily inserted between the axle and spring and to prevent it from moving therefrom.

The main objects of our invention are; to provide a shim in the nature of a wedge which may be employed between the spring and axle of an automotive vehicle to provide the proper "caster" thereto; to provide a wedge of the bifurcated type having sides which are so constructed as to provide a lock for preventing the movement of the wedge from between the spring and axle; to provide a bifurcated wedge which may readily be driven between the spring and axle of an automotive vehicle which is so constructed as to prevent a reverse movement therefrom in the presence of the vibration of the axle and spring; and in general, to provide a shim in the nature of a wedge for producing the proper caster to an automotive vehicle axle, which is simple in construction, economical of manufacture and positive in operation.

Other objects and features of novelty of our invention will be either specifically pointed out or will become apparent when referring, for a better understanding of our invention, to the following description in conjunction with the accompanying drawing, wherein.

Figure 1:
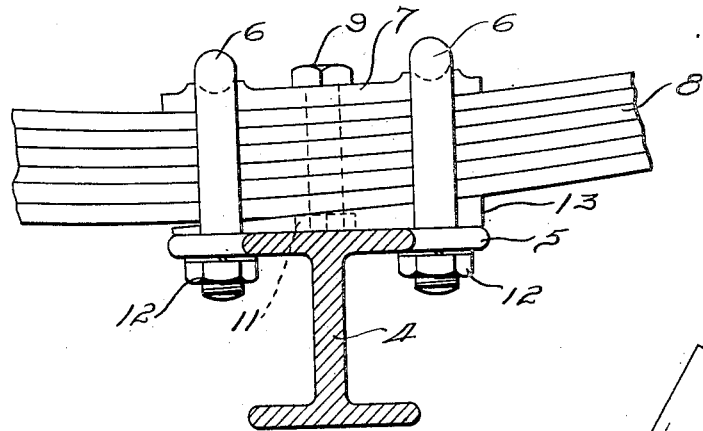
Figure 1 is a broken view, in side elevation, of an axle and spring having a wedge interposed therebetween which embodies features of our invention.

Referring to Fig. 1, we have illustrated an automotive vehicle axle 4 which is of the well known type, being provided with ears 5 through which U bolts 6 extend. The U bolts are positioned by a plate 7 which is disposed on the top of leaf springs 8 and retained thereon by a bolt 9 which extends through the leaves of the spring to retain them in longitudinally and laterally disposed positions. A hole is drilled in the top of the axle, or a separate plate is employed, for receiving a nut 11 which is screwed upon the bolt 9 and projects below the lower leaf of the spring. The U bolts 6 are drawn downwardly by nuts 12 to clamp the springs 8 in firm fixed relation to the axle 4. The springs are so swung on shackles (not shown) that when the axle is bolted in this manner to the springs, a predetermined caster will be provided to the king pins at the ends of the axle to tilt the pins forwardly, which is the well known practice in the art. As pointed out hereinabove, this caster may in time be lost because of wear, bending of parts, shifting of the springs, or the like, and for this reason it is necessary to provide some cheap and reliable means for reproducing the caster to the king pins. The simplest known way in the art and which has been employed heretofore is to provide shims, in the nature of wedges, which may be inserted from the rear end of the spring to tilt the axle forwardly to thereby dispose the king pins in substantially the original tilted position.

As pointed out hereinabove, our invention relates to a wedge of the self-locking type which is employed to be driven into position between the spring 8 and the axle 4. The wedge 13, illustrated in Fig. 2, has a central slot 14 therein which divides the wedge to form two legs 15 and 16 which are rounded at their ends to permit them to be readily driven between the axle and the springs. The legs are provided with slots 17 for the purpose of producing tongues 18 which project within the slot 14. The space between the tongues 18 is less than the width of the nut 11 to thereby constitute a lock to prevent the reverse movement of the wedge 13 after it has been driven between the axle and the spring 8 to a position in which the tongues have passed beyond the nut.

Figure 3:
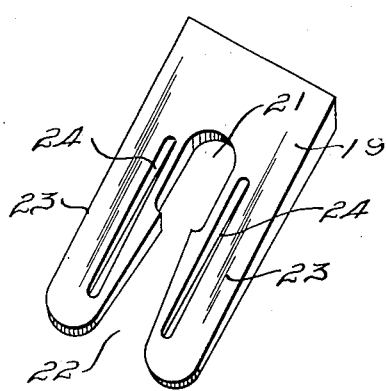
Fig. 3 is an enlarged perspective view of a modified form of wedge as shown in Fig. 2.

In Fig. 3 we have illustrated a modified form of wedge 19 having a central enlarged opening 21 communicating with the front end of the wedge through a tapered opening 22 to form the legs 23. In the body portion of the legs slots 24 are disposed for the purpose of providing flexibility to the inner edge of the slot 22 for permitting the nut 11 to pass therethrough into the enlarged opening 21 to act as a lock to prevent the wedge 19 from moving in a reverse direction.

Figure 2:
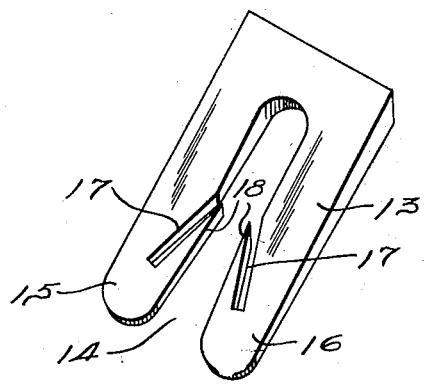
Fig. 2 is an enlarged perspective view of the wedge illustrated in Fig. 1.
Figure 4:
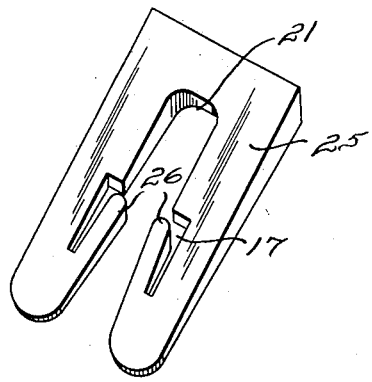
Fig. 4 is a perspective view of the structure similar to that illustrated in Figs. 1 and 2, showing a further modified form thereof.

In Fig. 4 a further modified form of wedge 25 is shown having the enlarged central opening 21 and the tapered opening 22 of the wedge 19 illustrated in Fig. 3, in combination with the slots 17 which were above described in relation to the structure illustrated in Fig. 2. The arms 26 formed by the slots 17 are resilient and movable inwardly toward the slots when the wedge is driven over the bolt 11 and movable outwardly thereafter to prevent the wedge from moving rearwardly of the bolt, to thereby lock the wedge 25 in fixed relation to the axle and springs when positioned therebetween.

It is to be understood that the wedges 13, 19 and 25 are made of a material to provide a predetermined resiliency to the tongues 18, legs 24 and arms 26, which therefore act as spring elements when moved over the nut 11 which move inwardly toward each other thereafter to prevent the reverse movement of the wedges, as explained hereinbefore. Various thicknesses of wedges may be employed, as is well known, to produce the proper caster to the axle and king bolts. The self-locking feature eliminates the bosses or flanged portions provided heretofore and the wedge is materially simplified and readily insertable between the axle and springs.

While we have described and illustrated several embodiments of our invention, it will be apparent to those skilled in the art that various changes, additions, omissions and substitutions may be made therein without departing from the spirit and scope of our invention as set forth in the accompanying claims.

We claim our invention:

1. The combination with an automotive vehicle axle and a spring having a bolt therethrough to which said axle is retained by clamping means, of a wedge insertable between said axle and spring to effect a tilt to the axle relative thereto, said wedge being provided with a central slot which projects over a portion of the bolt, said wedge being provided with inwardly projecting tenons which prevent the reverse movement of the wedge after being disposed over said bolt.

2. The combination with an automotive vehicle axle and a spring having a bolt therethrough which is clamped to the axle by securing elements, of a wedge insertable between said axle and said spring for tilting the axle forwardly of the vehicle to provide the proper castor to the king pins thereof, said wedge being provided with a pair of spaced legs having slots therein to form inwardly projecting tongues extending into the space therebetween to permit the wedge to be driven over the bolt head and to lock the wedge in place thereafter.

3. The combination with an automotive vehicle axle, a spring having a bolt therethrough and clamping elements for retaining the spring to the axle, of a wedge shaped element having two branches which are spaced apart to be insertable between the spring and axle to have the bolt disposed between the branches, the inner edge of each branch being provided with inwardly projecting tenons which permit the wedge to be driven over the bolt and which securely locks the wedge relative to the bolt to prevent a reverse movement thereto.

4. The combination with a spring having a bolt therethrough and axle of an automotive vehicle which are clamped together by securing elements, of a wedge element having two legs which are spaced apart and provided with inwardly projecting spring tenons which are forced over an end of the bolt when the wedge is driven between the spring and axle to clamp the wedge from a reverse movement after being positioned.

5. The combination with an automotive vehicle axle and spring having a bolt therethrough to which said axle is retained by clamping means, of a wedge for providing a tilt to the axle insertable between said spring and said axle, said wedge having a central slot therein, the sides of which project inwardly a portion of their length to form an inner recess in which a portion of the bolt is received.

WILLIAM H. WALLACE.
THURMAN C. MORRISON.
CLARENCE A. BIEBER.